United States Patent
Abraham et al.

(10) Patent No.: US 8,951,316 B2
(45) Date of Patent: Feb. 10, 2015

(54) MODIFIED GAS AND STEAM TURBINE PROCESS WITH INTEGRATED COAL GASIFICATION UNDER PRESSURE

(75) Inventors: Ralf Abraham, Bergkamen (DE); Domenico Pavone, Bochum (DE)

(73) Assignee: ThyssenKrupp Industrial Solutions AG, Essen (DE)

(*) Notice: Subject to any disclaimer, the term of this patent is extended or adjusted under 35 U.S.C. 154(b) by 1105 days.

(21) Appl. No.: 12/737,032

(22) PCT Filed: May 15, 2009

(86) PCT No.: PCT/EP2009/003470
§ 371 (c)(1),
(2), (4) Date: Feb. 4, 2011

(87) PCT Pub. No.: WO2009/146784
PCT Pub. Date: Dec. 10, 2009

(65) Prior Publication Data
US 2011/0120139 A1    May 26, 2011

(30) Foreign Application Priority Data
Jun. 2, 2008    (DE) .......................... 10 2008 026 267

(51) Int. Cl.
*C10J 3/46* (2006.01)
*C01B 6/24* (2006.01)
(Continued)

(52) U.S. Cl.
CPC ... *C10J 3/52* (2013.01); *C01B 3/32* (2013.01); *C10K 1/026* (2013.01); *C10K 1/32* (2013.01);
(Continued)

(58) Field of Classification Search
CPC .................. C10J 2300/1625; C10J 2300/1634
USPC ........................................................ 48/197 R
See application file for complete search history.

(56) References Cited

U.S. PATENT DOCUMENTS 3,750,372 A    8/1973    St. Cyr et al.
3,762,134 A    10/1973   St. Cyr et al.
(Continued)

FOREIGN PATENT DOCUMENTS

GB    1587 490 A    4/1981
WO    WO 99/14473 A1    3/1999
(Continued)

OTHER PUBLICATIONS

Malgorzata Rys; "Investigation of Thermodynamic Properties of Alkali Metals in Oxide Systems Relevant to Coal Slags"; S. 1-5; Dissertation.
RWTH Aachen, Nov. 6, 2007; Tag der Veroeffentlichung: May 23, 2008.

*Primary Examiner* — Matthew Merkling

(57) ABSTRACT

A process for the production, treatment and combustion of synthesis gas for the purpose of generating electric power is disclosed. The synthesis gas is produced from a solid, carbon-containing fuel with the aid of an oxygen-containing gas and treated by a slag-separating device and a device separating alkalis. Subsequently, the synthesis gas produced is fed to an expansion turbine where the pressure energy is used for generating power. On account of the treatment and separation of alkalis the expansion turbine is protected from corrosion and mechanical impact. The expanded synthesis gas is then burnt under pressure and the combustion is used in a combined-cycle process using a gas turbine, steam generator and steam turbine for generating power. The process thus has an increased efficiency. Apparatus for use of the process is also described.

13 Claims, 1 Drawing Sheet

(51) Int. Cl.
*C10J 3/52* (2006.01)
*C01B 3/32* (2006.01)
*C10K 1/02* (2006.01)
*C10K 1/32* (2006.01)
*F02C 3/28* (2006.01)
*F02C 6/18* (2006.01)

(52) U.S. Cl.
CPC ... *F02C 3/28* (2013.01); *F02C 6/18* (2013.01); *C01B 2203/0244* (2013.01); *C01B 2203/025* (2013.01); *C01B 2203/04* (2013.01); *C01B 2203/042* (2013.01); *C01B 2203/0465* (2013.01); *C01B 2203/147* (2013.01); *C01B 2203/84* (2013.01); *C10J 2300/1606* (2013.01); *C10J 2300/165* (2013.01); *C10J 2300/1653* (2013.01); *C10J 2300/1675* (2013.01); *Y02E 20/18* (2013.01); *Y02E 50/11* (2013.01)
USPC ............... 48/197 R; 48/210; 48/61; 423/644

(56) References Cited

U.S. PATENT DOCUMENTS

| | | | |
|---|---|---|---|
| 4,185,843 | A | 1/1980 | Beyer et al. |
| 4,340,399 | A | 7/1982 | Luthra et al. |
| 4,920,898 | A | 5/1990 | Solbes et al. |
| 5,503,660 | A * | 4/1996 | Reimert et al. ............ 95/268 |
| 6,167,692 | B1 | 1/2001 | Anand et al. |
| 6,233,916 | B1 | 5/2001 | Anand et al. |
| 7,402,188 | B2 | 7/2008 | Sprouse |
| 7,699,908 | B2 | 4/2010 | Menzel |
| 7,740,672 | B2 | 6/2010 | Sprouse |
| 2009/0158701 | A1 * | 6/2009 | Hoffmann et al. ......... 60/39.12 |

FOREIGN PATENT DOCUMENTS

WO    WO 03/099965 A2    12/2003
WO    WO 2005/054412 A1    6/2005

\* cited by examiner

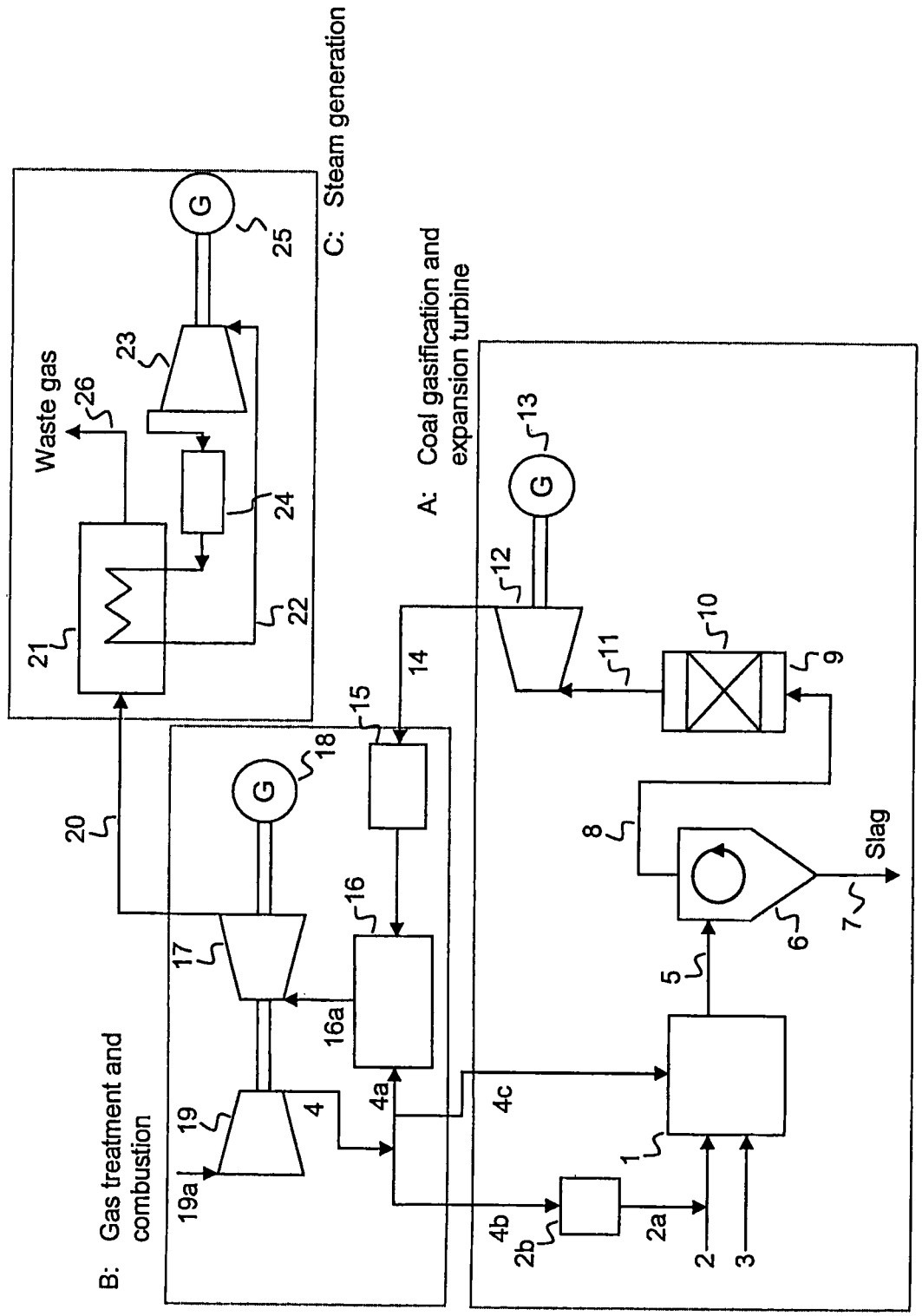

MODIFIED GAS AND STEAM TURBINE PROCESS WITH INTEGRATED COAL GASIFICATION UNDER PRESSURE

BACKGROUND OF THE INVENTION

The invention relates to a process for the production of synthesis gas from a carbon-containing fuel as, for example, all types of coal, coke, petroleum coke, biomass but also emulsions, orimulsion, etc., and the combustion of such synthesis gas for heat and power generation. By the inventive process the synthesis gas can be cleaned easily without any further cooling and its heat and pressure energy first be used for power generation and its chemical energy for power generation using a conventional combined-cycle process. The interconnected treatment of the synthesis gas facilitates the generation of power by an additional turbine without the turbines being damaged by corrosive components. The invention also relates to a contrivance with the aid of which this process can be implemented.

In the production of synthesis gas from a carbon-containing fuel, the fuel reacts with air or oxygen or oxygen-enriched air with a potential content of water vapour in a reactor suited for this purpose. Apart from synthesis gas also mineral slags are obtained in this process, which generally consist of aerosols or droplets. Some of these liquids partly evaporate and form alkali vapours and hydrogen chloride. In most cases these are very disturbing for the further use as they may damage or adversely affect the sections of the downstream process facilities.

For this reason it is advantageous to remove the entrained foreign constituents from the synthesis gas produced. DE 10 2007 063 118 A1 describes a process for the treatment of a synthesis gas by bringing it into contact with getter ceramics, the synthesis gas being routed without pre-cooling to a slag separation device in which slag droplets are withdrawn as liquid slag. The slag separation device can be of a cyclone type or be a packed bed of an inert material in which the slag separates from the gas.

This type of treatment does not entail cooling or expansion of the synthesis gas so that its pressure and heat energy can be used for driving the expansion turbine. Only then will the synthesis gas be passed to a process which uses the produced synthesis gas in a great variety of ways. The additional turbine facilitates a better use of the pressure and heat energy of the synthesis gas produced so that the efficiency of the process for the generation of power from synthesis gas is considerably improved. The mechanical energy can, for example, be used for the generation of power.

The synthesis gas produced is frequently used for the production of chemical products. However, it is also possible to burn the synthesis gas thus generated and use the produced combustion gas first to drive a gas turbine. This serves for an optimum use of the pressure energy from combustion. The heat of the combustion gas expanded by the turbine is then used for the generation of steam. The steam drives a steam turbine by means of which power can be generated. This process—the simultaneous use of the pressure energy from combustion and the generation of steam for driving a steam turbine—is commonly called a combined-cycle process.

Processes for the production of synthesis gas with the purpose of combustion for the generation of power in a combined-cycle process are already known. U.S. Pat. No. 6,233,916 B1 describes a process for the generation of electric power using the pressure energy of the fuel gas for driving a turbine. The heat of the expanded fuel gas can be used by a system of heat exchangers. The fuel gas may be of any type. It may, for example, be a natural gas or an industrial gas which originates from chemical industry and is passed to combustion. This process involves a better use of the pressure and heat energy of the fuel gas. The process also includes subsequent steam and power generation.

The gas used here must be free of corrosive constituents. However, many industrial gases used for the generation of power contain corrosive constituents. In particular, synthesis gas produced in a coal gasification process still contains a larger amount of molten slag directly downstream of the gasification section and also particularly contains halogenated compounds such as alkali vapours or hydrogen halides. This will cause problems if a turbine installed upstream of the combustion process is used. The corrosive constituents of the synthesis gas can damage the turbine blades, the turbine shaft or the bearings. For this reason, purified gases must be used when using upstream turbines.

However, the treatment of synthesis gas entails a lot of effort. For this purpose, the synthesis gas obtained must be cooled down and passed through a gas scrubber. After gas scrubbing, the treated gas is obtained which must possibly be re-heated for combustion. This involves high costs. In addition, gas scrubbing processes require much equipment.

The aim is therefore to provide a simple method for the treatment of synthesis gas which is integrated in the process. The process for power generation is preferably a combined-cycle process which uses the combustion gases in two stages for power generation. Such units of adequate design are of a high efficiency. The fuel can be used more efficiently when using a coal gasification process. In addition, a larger variety of fuels can be used when using a downstream combustion for the production of synthesis gas.

BRIEF SUMMARY OF THE INVENTION

The invention achieves this objective by providing an integrated process for the hot treatment of a synthesis gas. After production the synthesis gas is routed through a device separating slag and alkalis. The slag-separating device can be of any type, preference is given, however, to a cyclone-type device. The device separating alkali ions or alkalis is a getter ceramics which is preferably installed in a vessel passed through by the gas to be treated. It is also possible to add the getter ceramics for separating the alkali ions or alkalis to the fuel already. The invention also provides a contrivance for running this process.

Although the process is particularly well-suited for the supply of electric power from synthesis gas in a combined-cycle process, it is also possible to use this process for the combustion of synthesis gas for the purpose of simple generation of steam and recovery of electric power. In this case the investment costs are reduced as no gas turbine is required. To achieve a higher efficiency, the entire process is, however, also equipped with a gas turbine which uses the pressure energy from combustion. In an ideal embodiment the process thus utilises the pressure energy from fuel gas production, combustion and steam generation. The gas turbine uses both the pressure and the heat for power generation.

Claim is particularly laid to a process for the production and combustion of synthesis gas by gasification with air or oxygen or oxygen-enriched air with a potential content of water vapour, a solid or liquid fuel being supplied to a reactor where the fuel reacts with air or oxygen or oxygen-enriched air and with water vapour at elevated temperature to form a synthesis gas which mainly consists of hydrogen and carbon monoxide, and mineral slag droplets being obtained during the reaction, which are discharged from the reactor together with the synthesis gas produced, with the synthesis gas being routed without pre-cooling to a slag separation device in which slag droplets agglomerate and are withdrawn as liquid slag, and the vaporous alkalis and the hydrogen chloride contained in the synthesis gas being removed from the synthesis gas by bringing them into contact with getter ceramics, and which is characterised in that after treatment the synthesis gas is passed through an expansion turbine where the pressure and heat energy of the synthesis gas are converted to rotational energy, and the synthesis gas is then burnt and expanded in one of the subsequent process steps of a gas turbine and the combustion gases are used for driving a turbine and generating steam.

BRIEF DESCRIPTION OF THE DRAWINGS

FIG. 1 shows the process flow of an inventive process.

DETAILED DESCRIPTION OF THE INVENTION

The process steps for the separation of slag and alkalis are preferably implemented one after the other subsequent to the process of coal gasification. The slag is preferably separated in a cyclone-type device in which the gas makes a circular movement so that major part of the slag is separated by centrifugal forces. It is also conceivable to pass the combustion gas through a packed bed where the slag separates from the gas. A device with a plurality of grids where the slag can separate is also conceivable.

The alkali-separating device as well can be of any type desired. In a simple and effective embodiment of the invention the device can be designed such that in a vessel there is a packed bed of a getter ceramics through which the gas to be treated is passed. In a further embodiment of the invention getter ceramics in the form of any geometric shape desired are used which filter the corroding alkalis from the synthesis gas. In a further embodiment of the invention the getter ceramics can also be added in the form of fine particles to the synthesis gas generation. In this way the alkalis will be filtered from the process in the gasification chamber already.

After these process steps a treated gas is obtained the corroding nature of which has been reduced to a large extent or eliminated completely. In a typical embodiment the content of alkalis in the treated synthesis gas amounts to <100 ppm. In such quality, the synthesis gas can be passed through an expansion turbine. In this case, it is a turbine for the generation of rotational energy by means of gas pressure. The turbine can be of any type desired. Depending on the operating pressure of the gasification unit, the turbine can, for example, be designed as a high-pressure or low-pressure turbine. In this way the turbine can be adapted to the process. On account of the separation of slag and alkalis the expansion turbine has a considerably longer service life. Therefore, the turbine can be of less expensive design and has considerably prolonged maintenance intervals.

After expansion of the gas by passing through the expansion turbine, the gas is routed to the combustion unit. Depending on the gas purity it may be necessary to submit the gas to an additional gas treatment in a gas scrubber. Gas scrubbing is particularly necessary if the coal used has a high sulphur content and the sulphur must be removed from the combustion gas. Gas scrubbing is performed by the common gas scrubbing processes and, for example, with the aid of a physical solvent. WO 2005054412 A1 gives an example of a suitable process. However, it is also possible to use a chemical solvent. Finally, it is also possible to use a solid chemical sorbent. This is particularly suitable if the waste gas must be of a very low sulphur content.

The rotational energy of the turbine can be used for power generation. However, it can also be used for driving machinery, such as pumps or compressors. The driven compressor can, for example, compress the air for the performing the coal gasification or the combustion. If the coal gasification reactor is operated with the aid of oxygen from an air separation unit, it will also be possible to drive the air separation unit by the turbine. Of course, this can also take place partially, i.e. by branching off rotational energy for partial power generation.

The treated and partially expanded gas is then burnt for power generation. In a preferred embodiment of the invention the process for power generation is a combined-cycle process which uses both the pressure energy of the gas after combustion and the generated steam for driving a turbine. After the gas has passed the gas turbine, a boiler is heated where feed water is evaporated. The generated steam is pressurised and can drive a turbine. When passing through the turbine(s) major part of the steam is expanded. In a preferred embodiment the steam is condensed after expansion and reused as feed water. However, the combustion gas can directly be burnt and used for steam generation. This will reduce the equipment costs but also the efficiency of the entire process.

Here as well the turbines can be used for generating electric power. However, it is also possible to use the turbines for driving machinery, such as compressors or pumps. The process for the production of synthesis gas can be of any type desired. All solid and liquid carbon-containing fuels can be used. These can, for example, be all types of coal, coal emulsion, orimulsions, petroleum coke, biological fuels or granulated plastics. The process can also include preparatory steps such as fuel storage, grinding and pressing. In a typical embodiment coal gasification is performed at 800 to 1800° C. A typical pressure for performing coal gasification is a pressure of 0.1 to 10 MPa. This may vary in the course of the process.

Claim is also laid to a contrivance with the aid of which the inventive process can be run. The contrivance naturally consists of several sections as frequently found in power plant construction. Claim is particularly laid to a contrivance used for the production and combustion of synthesis gas and consisting of a coal gasification reactor suited for the gasification of carbon-containing fuels at high temperatures, the coal gasification reactor being followed by a treatment unit used for the cleaning of synthesis gas and consisting of a device separating slag and of a device separating alkalis, and the treatment unit for the cleaning of synthesis gas being followed by an expansion turbine, and the gas leaving the expansion turbine in one of the subsequent process steps being conveyed to the combustion chamber of a gas turbine where the synthesis gas can be burnt and the combustion unit being followed by a gas turbine which is driven by the combustion gas, thereby generating power, and the combustion gas being fed to a steam generator which generates steam which is then routed to a steam turbine which serves to generate power.

In a simpler embodiment it is also possible to do without the gas turbine. The lack of the gas turbine, however, will reduce the efficiency of the entire facility. In a preferred embodiment the inventive contrivance includes a gas turbine for generating energy from the combustion of the industrial gas. The coal gasification reactor for producing synthesis gas can be of any type desired.

In an embodiment of the invention the slag-separating device consists of a cyclone-type device. It uses the centrifugal forces of the gas for separating the slag droplets. It includes a discharge nozzle and a discharge device for the slag. It is also possible to use a packed bed made of a slag-resistant material. In order to discharge the slag, the packed bed is advantageously equipped with a withdrawal device for liquid slag. The packed bed typically consists of a granular material made of, for example, oxidic or non-oxidic ceramics or a mixture of these two ceramics.

The device separating alkalis is preferably accommodated in a vessel containing getter ceramics. This typically consists of silicon dioxide or silicates or aluminates or aluminium oxide. The getter ceramics can also be made of a mixture of these substances or be a compound from a mixture of these substances. The getter ceramics must have a good absorption capacity for alkalis and halogenides. It should advantageously also be able to absorb alkaline earth halogenides or hydrogen halides. It can be arranged as a pebble bed, as a grid, in the form of trays or in the form of any geometric shape desired.

Depending on the desired degree of purity of the fuel gas, the contrivance can also include a gas scrubber which in the process flow is typically located between the expansion turbine and the combustion unit. It is equipped with the devices and sections required for that purpose. It is also possible to install devices for feeding chemical sorbents in this place. Limestone, dolomite or alkaline earth hydroxides can, for example, be used as chemical sorbents. However, transition metal-containing compounds can also be used.

Finally, the inventive contrivance can include all the equipment required for power plant construction. This can be pumps, valves, compressors or vacuum-generating facilities. However, these can also be heating elements or cooling devices or heat exchangers. The turbines in the process can be of any type desired. These can be radial or axial turbines. Depending on the pressure of the expansion gas the turbines are high-pressure or low-pressure turbines which differ in the arrangement and spacing of the blades. The choice of the suitable turbine is left to the responsible specialist. However, it is also possible to connect the turbines and compressors in a single-line arrangement with the generator. This type of construction facilitates a simpler control of the turbo generator and is space-saving and considerably cheaper.

The steam-generating unit also includes all necessary devices. These can be steam boilers and evaporators of all designs. Typical equipment items frequently used, such as centrifugal water separators and superheaters, can be part of the inventive contrivance. This also includes drive shafts and generators.

The inventive process involves the possibility of achieving a power generation of a very high efficiency. The process does not require equipment-intensive combustion facilities but facilitates a space-spacing process by means of a coal gasification. A waste gas of very low emissions can also be obtained by the integration of gas-treating facilities, if required.

The process flow of the inventive process is detailed in a sketch, the inventive process not being restricted to this embodiment. For a better overview the process flow is broken down in three units (A,B,C).

FIG. 1 shows the process flow of an inventive process. A carbon-containing fuel is fed to a coal gasification reactor (1). This fuel is mixed with an oxygen-containing gas (2) and, if required, with water vapour (3) so that the fuel reacts to form generator gas or synthesis gas. If required, the coal gasification reactor can be charged with combustion air (4) from a compressor (19) or supplied with oxygen (2a) form an air separation unit (2b). The air separation unit (2b) can also be supplied with air (4) from the compressor (19). A raw synthesis gas (5) is obtained. This is fed to a slag-separating device (6), thereby being freed from the liquefied slag particles. The separated slag (7) is obtained. The synthesis gas freed from the liquid slag (8) is conveyed further and fed to a device separating alkalis (9) equipped with getter ceramics (10). The synthesis gas treated and freed from alkalis (11) then drives an expansion turbine (12). The latter is connected with a generator (13). The generator (13) generates power. This whole unit forms section A (coal gasification and expansion turbine).

The expanded synthesis gas (14) is fed to a gas treatment unit (15). There it is freed from the non-desired foreign gases. Then the synthesis gas is burnt in a combustion chamber (16). The hot waste gas (16a) is obtained which flows through a turbine (17). The turbine drives a generator (18) and a compressor (19). The generator (18) generates power. The compressor supplies compressed air (4) for the combustion process (4a), the air separation unit (4b) or the gasification process (4c). This whole unit forms section B (gas treatment and combustion).

The waste gas (20) from the gas turbine is fed to a steam generator (21). There, steam (22) is generated which drives a turbine (23). The steam is fed to a condenser (24), is liquefied and recycled to the process. This turbine (23) as well is used to drive a generator (25) which supplies power. The gas (26) leaving the steam generator is discharged and, if required, passed to a treatment unit. This whole unit forms section C (steam generation).

LIST OF REFERENCE NUMBERS AND DESIGNATIONS

1 Coal gasification reactor
2 Air or oxygen
2a Oxygen stream
2b Air separation unit
3 Water vapour
4 Compressed air
4a Compressed air for combustion
4b Compressed air for air separation unit
4c Compressed air for coal gasification reactor
5 Raw synthesis gas
6 Slag-separating device
7 Slag withdrawal
8 Synthesis gas freed from slag
9 Device separating alkalis
10 Getter ceramics
11 Treated synthesis gas
12 Expansion turbine
13 Generator
14 Expanded synthesis gas
15 Gas treatment
16 Combustion chamber
16a Flue gas to turbine
17 Gas turbine
18 Generator
19 Compressor
19a Air supplied to compressor
20 Expanded combustion gas
21 Steam generator
22 Steam
23 Steam turbine
24 Condenser
25 Generator
26 Waste gas/flue gas

The invention claimed is:

1. A process for the production and combustion of synthesis gas by gasification with air or oxygen or oxygen-enriched air with a potential content of water vapour, comprising:
   supplying a solid or liquid fuel to a reactor where the fuel reacts with air or oxygen or oxygen-enriched air and with water vapour at elevated temperature to form a synthesis gas which mainly comprises hydrogen and carbon monoxide;
   obtaining mineral slag droplets during the reaction, which droplets are discharged from the reactor together with the synthesis gas produced; and
   routing the synthesis gas without pre-cooling to a slag separation unit in which slag droplets agglomerate and are withdrawn as liquid slag, and removing vaporous alkalis and hydrogen chloride contained in the synthesis gas from the synthesis gas by bringing them into contact with getter ceramics, wherein
   after treatment the synthesis gas is passed through an expansion turbine wherein the pressure and heat energy of the synthesis gas are converted to rotational energy; and
   the synthesis gas is then burnt and expanded in one of the subsequent process steps of a gas turbine and the combustion gases are used for driving a turbine and generating steam.

2. The process according to claim 1, wherein the slag-separating device is a cyclone-type device in which the hot gas makes a circular movement so that major part of the slag contained in the gas is separated by centrifugal forces.

3. The process according to claim 1, wherein the slag-separating device contains a packed bed in which the slag separates from the gas.

4. The process according to claim 1, wherein the getter ceramics provided in the form of a packed bed comes into contact with the synthesis gas in a device installed downstream of the separation unit and the removal of the alkalis from the synthesis gas is performed in this downstream device.

5. The process according to claim 1, wherein the gas is treated between the expansion turbine and the combustion unit.

6. The process according to claim 5, wherein the gas is treated in a gas scrubber with the aid of a physical solvent.

7. The process according to claim 5, wherein the gas is treated by adding a chemical sorbent.

8. The process according to claim 1, wherein a generator which generates power is driven by the expansion turbine.

9. The process according to claim 1, wherein a compressor which compresses the air for the gasification reactor is driven by the gas turbine.

10. The process according to claim 1, wherein one of: coal, coal emulsions, coal slurry, petroleum coke, emulsions, orimulsions, biological fuels or granulated plastics are used as fuels.

11. The process according to claim 1, wherein the gasification is carried out at a temperature of 800 to 1800° C.

12. The process according to claim 1, wherein the gasification is carried out at a pressure of 0.1 to 10 MPa.

13. A process for the production and combustion of synthesis gas by gasification with air or oxygen or oxygen-enriched air with a potential content of water vapour, comprising:
   supplying a solid or liquid fuel to a reactor where the fuel reacts with air or oxygen or oxygen-enriched air and with water vapour at elevated temperature to form a synthesis gas which mainly comprises hydrogen and carbon monoxide;
   obtaining mineral slag droplets during the reaction, which droplets are discharged from the reactor together with the synthesis gas produced; and
   routing the synthesis gas without pre-cooling to a slag separation unit in which slag droplets agglomerate and are withdrawn as liquid slag, and removing vaporous alkalis andhydrogen chloride contained in the synthesis gas from the synthesis gas by bringing them into contact with getter ceramics, wherein
   after treatment the synthesis gas is passed through an expansion turbine wherein the pressure and heat energy of the synthesis gas are converted to rotational energy; and
   the synthesis gas is then burnt and expanded in one of the subsequent process steps of a gas turbine and the combustion gases are used for driving a turbine and generating steam; and wherein
   the gas is treated in a gas scrubber arranged between the expansion turbine and the combustion unit.

* * * * *